United States Patent [15] 3,644,724

Angelov et al. [45] Feb. 22, 1972

[54] CODED DECIMAL MULTIPLICATION BY SUCCESSIVE ADDITIONS

[72] Inventors: Stefan Hristov Angelov; Snejanka Vladimirova Hristova, both of Sofia, Bulgaria

[73] Assignee: Zentralen Institut po Istchislitelna Technika, Sofia, Bulgaria

[22] Filed: Mar. 27, 1970

[21] Appl. No.: 23,405

Related U.S. Application Data

[63] Continuation-in-part of Ser. No. 672,501, Oct. 3, 1967, abandoned.

[30] Foreign Application Priority Data

Oct. 4, 1966 Bulgaria ..................................I-1174

[52] U.S. Cl. ..............................................235/159, 235/160

[51] Int. Cl. ..........................................................G06f 7/52

[58] Field of Search .................................235/159, 160, 164

[56] References Cited

UNITED STATES PATENTS 3,016,194 1/1962 Bensky et al.......................235/159 X 3,330,946 7/1967 Scuitto.................................235/160

3,361,898 1/1968 Radcliffe, Jr. et al..................235/160

*Primary Examiner*—Eugene G. Botz

*Assistant Examiner*—David H. Malzahn

*Attorney*—Karl F. Ross

[57] ABSTRACT

A circuit and system for performing multiplication operations in a desk-top calculator having two registers designed to receive the multiplier and the multiplicand; the multiplier register has a number of order positions corresponding to the multiplication capacity or maximum product while the multiplicand register has a number of orders corresponding to at least one more than the maximum number of orders of the multiplicand to be handled. The value stored in the highest order position of the multiplier register is read and as long as it is "0," the contents of the multiplier register is shifted toward the highest order position. When a nonzero value arrives at the highest order position of the multiplier register, a "9" is formed in the highest order position of the multiplicand register and the contents of the multiplier and multiplicand registers are added, the result being stored in the multiplier register. The highest order positions of both registers are similarly summed and the tens value of the highest order addition is dropped, thereby diminishing the number in the highest order position of the multiplier register by "1" with each addition. The cycle is repeated until the entire multiplier has been reduced to zero. The product is found in the lower order portion of the multiplier register.

10 Claims, 1 Drawing Figure

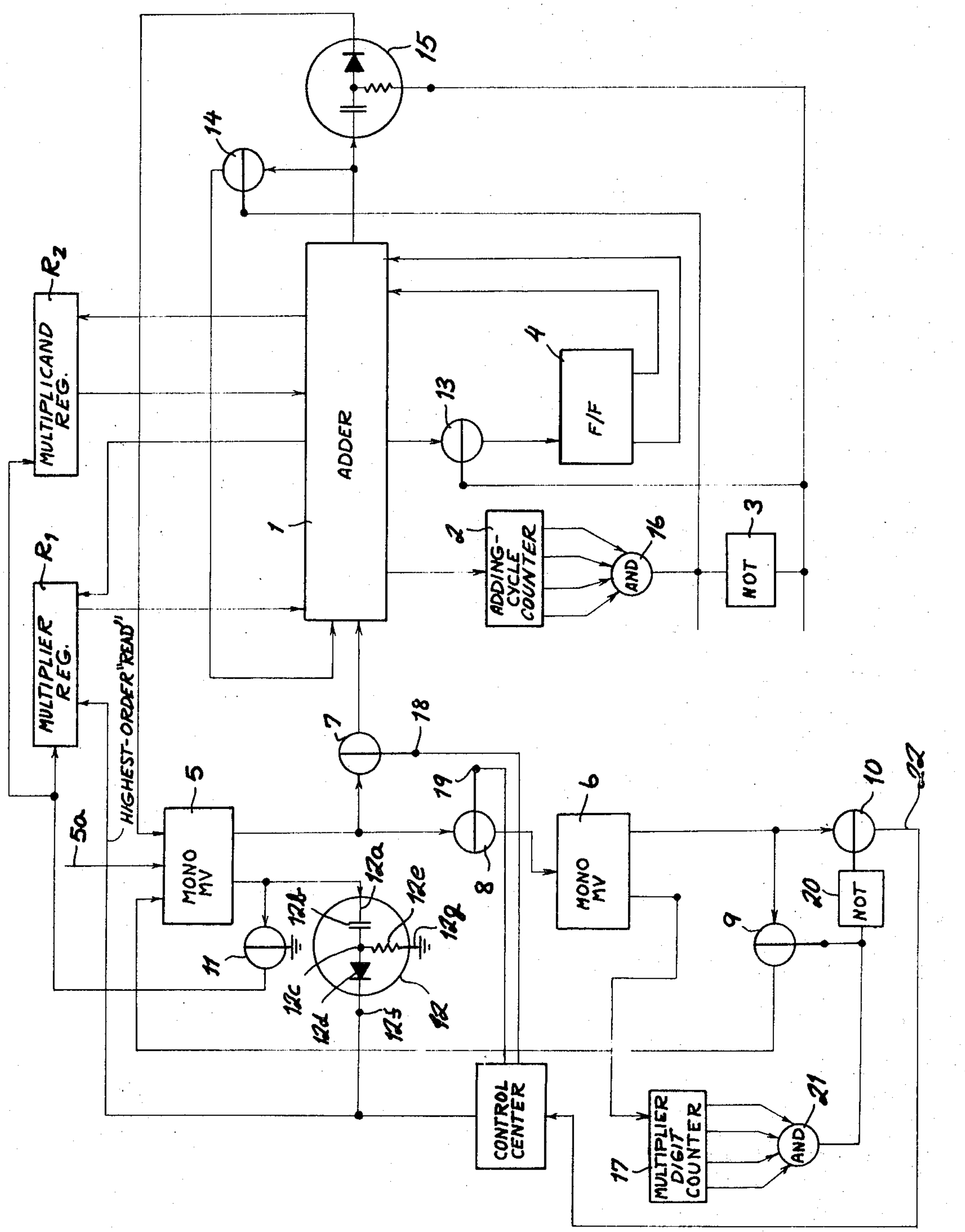
INVENTORS:
Stefan H. Angelov
Snejanka V. Hristova
BY
Karl F. Ross
Attorney

CODED DECIMAL MULTIPLICATION BY SUCCESSIVE ADDITIONS

CROSS-REFERENCE TO COPENDING APPLICATION

This application is a continuation-in-part of our application Ser. No. 672,501 filed Oct. 3, 1967, now abandoned.

1. Field of the Invention

Our present invention relates to a method of and a circuit for performing multiplication in desk-top calculators or electronic computers and, more particularly, to a simplified logic circuit for performing such operations.

2. Background of the Invention

In general, multiplication operations have been carried out in desk calculators, electronic calculators and computers by storing the multiplier and multiplicand in respective registers, counters or memories, and a mechanical, electromechanical or electronic system is operated for performing successive additions of the multiplicand with appropriate shifting in accordance with the magnitude of the order of the multiplier governing the number of addition operations to be carried out.

The digits of the multiplier, beginning with the highest order digit (or with the lowest order digit in accordance with the direction of shift of the result of the summation) are subtracted successively in a counter which determines the number of times the multiplicand is to be accumulated or summed (depending upon the magnitude of the multiplier orders). The counter operates until its value (the value of the multiplier) is reduced to zero, whereupon the summation ceases and the result is found in the product-storage register of the calculator.

These systems are highly complex, require numerous counters and relatively expensive and manifold logic circuits to perform the various operations as discussed above.

OBJECTS OF THE INVENTION

It is the principal object of the present invention to provide an improved system for performing multiplication operations in desk-top calculators or computers or in other calculating and computing devices of the character described.

Another object of this invention is to provide an improved but simplified logic circuit for performing multiplication, wherein the number of registers and ancillary components is reduced.

It is a further object of the invention to provide an improved method of performing multiplication in an apparatus of the class described.

SUMMARY OF THE INVENTION

As pointed out in the aforementioned application, the invention relates to desk calculators and computers having mechanical, electromechanical or electronic components for manipulating the multiplier and the multiplicand. All of the individual components are conventional or known from other systems and it is their concordance in the system of the present invention which distinguishes the system, and the method, over the known multiplication systems.

Basically, the present method comprises the steps of storing multiplier in a multiplier register having a number of orders corresponding to the maximum product constituting the capacity of the system and thus a number of orders at least equal to the sum of the orders of a multiplier and a multiplicand; the multiplicand is, in turn, stored in the multiplicand register which generally will have the same number of orders as the multiplier register but at least has an order in excess of the number of the orders of the multiplicand adapted to be handled by the system. Reference will be made herein to the "highest order position" or the "higher order side" and these expressions are intended to connote the position or side in which the highest order of a number stored in the particular register will be found. This of course depends on the nature of the register and will generally be at the left-hand side of the register in terms of the usual display characteristics of register contents. However, where the display presents numbers from right to left in accordance with usual notation, the register may also operate from left to right with appropriate wiring. Conversely, the "lowest order position" or the "lower order side" of the register will be the other side or position thereof.

According to the principles of the present invention, the highest order position of the multiplier register is "read" after the multiplier and multiplicand have been written in to the respective registers at the lower order side thereof, and the contents of the multiplier register is shifted toward the highest order position in a plurality of "read" cycles as long as a "0" is registered in the highest order position. Eventually, the shifting of the multiplier along the orders of the multiplier register will locate a nonzero digit at the highest order position and trigger a series of addition steps.

According to an important feature of this invention, when a nonzero digit is read at the highest order position of the multiplier register, the nine's complement of the highest order position of the multiplicand register is formed and, since this highest order position is originally vacant or "0," a "9" is provided thereat. Reference herein to the nine's complement is intended to correspond to a complementing of the value in accordance with the principles described in U.S. Pat. No. 2,798,667.

Addition of the contents of the multiplicand register and the contents of the multiplier register then forms a partial product at the lower order side of the multiplier register and since the sum of the "9" in the highest order position of the multiplicand register and the nonzero digit in the highest order position of the multiplier register will produce a sum whose tens order cannot be stored and whose units order has a value less by "1" than the aforesaid nonzero digit, the number stored at the highest order position of the multiplier register is reduced by "1" with each addition cycle.

The addition process is repeated until the highest order position of the multiplier register again records or is reduced to a "0," whereby the reading of the highest order position of the multiplier register triggers a shift of the entire contents of the multiplier register toward the highest order position until a nonzero digit is again registered therein. The sequence is continued until the entire multiplier has been reduced to zero, the product then being found in the lower order side of the multiplier register.

In accordance with the circuit aspects of the present invention, we provide an adding device or means capable of performing the addition of the contents of the multiplier register and the multiplicand register and adapted, via a gating system, to record the sum in the multiplier register.

A controlled CRD gate and a monostable multivibrator are provided, in accordance with this invention, to trigger the successive adding sequences of the adding device after the presence of a nonzero digit in the highest order position of the multiplier register has been ascertained, the highest order position value controlling the number of addition sequences via the monostable multivibrator and a logic CRD gate.

Still further, the system of the present invention comprises a counter of the adding cycles of one adding sequence and a coincidence gate, both determining whether the adding sequence is completed or not, providing an output to effect a continuation or repetition of the adding cycles until termination of the addition. The coincidence circuit, in turn, actuates a CRD gate connected to the adding device when continuation or repetition of the adding cycle is required. To terminate the addition sequence, we provide an inverter and a further controlled gate of the CRD type connected to the input of the monostable multivibrator. A third controlled CRD gate is connected to the adding device and is controlled by the inverter during the addition of the highest order positions of the registers to actuate a "flip-flop" or bistable multivibrator and perform the conversion of the multiplicand code (nine's complement) in the highest order position of the multiplicand from "0" to "9."

Still another feature of this invention resides in the provision of a further monostable multivibrator and a plurality of controlled CRD gates which trigger successive addition sequences or preclude a further addition sequence as is required. A counter provides a record of the digit of the highest order position of the multiplier while a logic CRD gate erases any overflow condition at the end of an addition resulting from inversion of the nines complement code.

The expression "adding cycle" herein is intended to describe the addition of the corresponding positions in both registers so that, if each register contains 10 positions, there will also be 10 addition or adding stops. Similarly, the expression "adding sequence" is used herein to denote the step, after each digit of a nonzero in the highest order position of the multiplier register has been converted into the nine's complement in the highest order position of the multiplicand register, of summing the contents of the two registers in the respective adding cycles, and storing the result in the multiplier register.

An essential feature of the circuit aspects of the present invention is the use of controlled and logic CRD gates as noted above. Such gates, also referred to conditional differentiating groups, comprise a capacitor, one terminal of which receives the signal input while the other terminal is connected to the junction of a resistor and the input side of a diode, the output side of the latter forming the signal output. The resistor of the controlled or sampling CRD gate is connected to the output of a further circuit and constitutes the control or enabling input of the gate. The further circuit is designed to apply a zero or negative potential.

By contrast, the logic CRD gate has its resistor connected to ground or zero potential. The terms "zero potential" or "-blocking input" and those of like import, are used for convenience to represent gate conditions. In fact, however, true zero potentials may never exist at the outputs of the multivibrators and gates and the sole distinction between the states of the latter may be the transition from low potential to high potential. In the art, therefore, expressions such as "true" and "high" have been used to indicate passing conditions or active outputs and "false" or "low" to indicate blocking conditions or passive outputs. It is to be understood, therefore, that these concepts of high and low, passive and active, etc., are intended only in the logic sense and not in the absolute sense whether these terms are used in the description or in the appended claims.

When a negative potential is applied to the control or enabling input of the controlled CRD gate, a pulse applied to its signal input cannot pass. On the other hand, since the resistor of the logic gate is always at zero potential, it will always pass a signal applied to the signal input. In passing the respective pulses, of course, the gate networks function in part as differentiating circuits.

DESCRIPTION OF THE DRAWING

The above and other objects, features and advantages of the present invention will become more readily apparent from the following description, reference being made to the accompanying drawing in which the sole FIGURE is a block diagram illustrative of the present invention.

SPECIFIC DESCRIPTION

In the drawing we have shown a circuit for the multiplication of a multiplier and a multiplicand. The circuit comprises a multiplier register $R_1$ and a multiplicand register $R_2$ in which the multiplier and the multiplicand are recorded in a digital code. The registers $R_1$ and $R_2$ may be of the type described at pp. 343 ff. of Pulse, Digital and Switching Waveforms, McGraw-Hill Book Company, New York, 1965, or in U.S. Pat. Nos. 3,330,946 and 3,361,898.

While base-10 digits are used in explanation of the system, it will be understood that each of the registers $R_1$ and $R_2$ has a number of orders or columns, each adapted to receive, in a digital code via the encoding device of the calculator, a respective digit (0–9) of a multiplier or multiplicand, the registers being further provided with the standard right-hand, read and shift circuitry whereby the successive digits of an input are stepped along the orders of the multiplier and multiplicand registers. Attention is directed, in this regard, to Digital Computer Basics, U.S. Government Printing Office, Washington, D. C., 1968, in which the storage, reading, writing, encoding and decoding of the numerals are described. It will be understood that the register may, as described in Pulse, Digital and Waveforms, have a plurality of flip-flop circuits constituting each "order," but that nevertheless a single digit only may be stored in the order in accordance with the multiplier and multiplicand values.

For the present purposes, each register will be described as having 12 orders with the lower order side to the right and the higher order side to the left, the order position at the extreme left of each register constituting the "highest order position" as described above and as will become apparent hereinafter.

The multiplier register $R_1$ and the multiplicand register $R_2$ are connected to an adding device or unit 1 which may be of the types described in U.S. Pat. No. 3,330,946 and 3,361,898 (see also pp. 85–90 of Digital Computer Basics and pp. 338–342 of Pulse, Digital and Switching Waveforms).

The multiplier register $R_1$ is connected to a logic CRD gate 12 (pp. 312–334 of Pulse, Digital and Switching Waveforms) having a single input **12*a* to a capacitor 12*b* tied to the junction 12*c* between a diode 12*d* and a resistor 12*e*. The signal output of the diode is derived at 12*f* and the resistor 12*e* is grounded as shown at 12*q*. Consequently, a zero potential is applied permanently to the resistor of the CRD gate so that a signal applied at the input 12*a* will pass. The symbol used to indicate the logic CRD gate is that shown at 11. The CRD gate 12 performs the reading of the highest order digit in the multiplier register $R_1$ by applying a pulse to actuate the latter and produce an output to the adder 1**.

The adding device 1 is connected to an adding cycle counter 2, e.g., of the type described in U.S. Pat. No. 3,330,946, which is stepped by 1 unit with each adding cycle. When the count becomes equal to the number of positions in both registers, the counter 2 furnishes a signal which terminates addition. A coincidence circuit 16 is connected to the output of the adding cycle counter 2 and is an AND-gate (see pp. 317–321 of Pulse, Digital and Switching Waveforms), which generates an output or creates a condition determining further continuation of the addition sequence or terminating the addition in accordance with the contents of counter 2. Normally, zero potentials are applied to the inputs of the coincidence circuit 16 signifying that no cycle is recorded in the counter 2. At the end of each recorded cycle, the corresponding input of circuit 16 is brought to a negative potential so that, until the last adding cycle is complete, i.e., the total number of orders of the registers $R_1$ and $R_2$ have been summed, there is at least one input with zero potential or blocking characteristic. When, of course, all of the orders have been added, the AND-gate 16 becomes conductive to provide an output. In the absence of a blocking output, the adding sequence is continued. With a 12-order register, the number of inputs to the AND-gate 16 will be 12, although a lesser number has been shown here to avoid confusion.

As indicated, upon completion of the last adding cycle, all of the inputs of circuit 16 are brought to a negative potential and the output of this AND-gate is similarly brought to a negative potential, determining the end of the adding operation.

In the absence of this negative output of the AND-gate 16, a signal for continuing addition is applied to the control or enabling input of the controlled gate 14 held at a zero potential by the coincidence circuit 16. The controlled gate 14 retriggers the adder 1 at the end of each adding cycle. When a signal determining the end of addition is established by the coincidence circuit 16, it passes through an inverter 3 in the form of a NOT-gate (see pp. 321–325 of Pulse, Digital and Switching Waveforms) and a controlled CRD gate whose enabling input is brought to a zero potential by the inverter 3. The controlled CRD gate 15 delivers a pulse to the monostable multivibrator 5 actuating the latter and establishing the end of the addition cycling for a particular adding sequence.

The adding device 1 is connected to a further controlled CRD gate 13 whose enabling input is brought to a zero condition by the inverter 3 together with controlled gate 15 at the addition of the highest order positions of both registers. The controlled CRD gate 13 serves to trigger a flip-flop or bistable multivibrator 4 (see U.S. Pat. No. 3,361,898), the latter constituting a converter or complementer to reverse the code of the highest order position of the multiplicand. For an explanation of the codes and the operation of a complementer of this type, see U.S. Pat. No. 2,798,667. The complementing or inversion of the code in the highest order position of the multiplicand register $R_2$ is a conversion of the digit in this highest order position from a "0" to "9" in the nine's-complement system.

The monostable multivibrator 5 generates pulses ensuring the performance of the basic computing operation and may be a monostable multivibrator circuit whose input *5a* is derived from the control station or center *7a* of the electronic desk calculator operating in an asynchronous mode (cf. U.S. Pat. No. 3,361,898). The monostable multivibrator 5 has an output serving to "read" the highest order digit of the multiplier register $R_1$ through the logic CRD gate 12 as described above and determines the start of the adding sequence when the highest order position of the multiplier register contains a nonzero digit. The access condition is delivered by a controlled CRD gate, the output of which is applied to the adder and whose signal input is connected to the monostable multivibrator 5, while its enabling input 18 is operated through the gate 12. The control circuits to this end are represented at *7a* and are not material to the purposes of the present invention and are conventional clock or trigger circuits with access gates as described in the aforementioned patents and publications.

A second monostable multivibrator 6 is triggered through the controlled gate 8 whose enabling input 19 is derived from the circuits *7a* of the calculator and generates a pulse determining the end of the multiplication as well as pulses for counting the multiplier digits. When a zero potential is applied to the enabling input 19, this signifies the reading of a "0" in the highest order position of the multiplier register $R_1$ to trigger the monostable multivibrator 6.

The output "0" of the monostable multivibrator 6 is applied through a multiplier-digits counter 17 to a coincidence circuit 21 of the AND-gate type previously described in connection with gate 16. The output "1" of the monostable multivibrator 6 is connected through a controlled CRD gate 9 to the monostable multivibrator 5 to determine continuation of multiplication and to the signal input of a controlled CRD gate 10. Output 22 which, when applied to the control center of the calculator, terminates the multiplication operation. The enabling input of the gate 10 is derived from an inverter 20 or NOT-gate similar to the gate 3, but whose input is formed by the output of the coincidence circuit 21. The controlled CRD gates 9 and 10 are brought to zero potential unless triggered by the circuitry of the control center which as noted, is not the subject of the present invention Monostable multivibrator 5 is connected as well to a logic CRD gate 11 whose output erases the overflow condition in the multiplicand register $R_2$ resulting at the end of addition from the presence of a "9" in the highest order position of the multiplicand register.

OPERATION

As described earlier, the monostable multivibrator 5 and the logic CRD gate 12 read the highest order digit of the multiplier register $R_1$, the output determining whether this digit is a "0" or some nonzero digit, the control electrodes 18 or 19 being brought to the zero potential depending upon which condition is ascertained.

When a "0" is present in the highest order position of the multiplier register, the gate 8 passes to trigger the multivibrator 6 and thereby shift the contents of the multiplier register $R_1$, previously recorded at the lower order side thereof, to the left by one position or order, i.e., toward the higher order side.

When the digit in the highest order position of the multiplier register is not a "0" (i.e., is a nonzero digit), gate 7 passes to operate the adder 1 and perform an adding sequence as described earlier together with the complementing of the highest order digit of the multiplicand register. A "9" is thereby provided in this highest order position via flip-flop 4. With each adding cycle, the flip-flop 4 sets a "9" in the highest order position of the multiplicand register unless a "0" is sensed in the highest order position of the multiplier register.

The addition sequence, upon summation of the highest order positions of both registers and the reregistration of only the units position of the result, diminishes the digit in the highest order position of the multiplier register by "1."

The operation is repeated until the highest order position of the multiplier contains a "0" whereupon the monostable multivibrator 6 triggers the counter 17 to register a "1" therein. When all of the digits of the multiplier have been processed, coincidence circuit 21 provides an input terminating the multiplication operation as previously described.

The invention will best be understood from the following example:

It is assumed that the multiplication to be executed is

13865×3124

At the beginning of the multiplying operation, the registers $R_1$ and $R_2$ (multiplier and multiplicand) of the logic circuit hold the following factors:

0 0 0 0 0 0 0 1 3 8 6 5—$R_2$ (multiplicand)
0 0 0 0 0 0 0 0 3 1 2 4—$R_1$ (multiplier)

The highest order digit in the multiplier register $R_1$ (i.e., the zero on the left-hand side) is read and since this digit is a zero, the contents of the multiplier register will be shifted one position to the left (toward the higher order side) within the register and the position vacated will be filled with a zero 0 0 0 0 0 0 0 1 3 8 6 5—$R_2$
0 0 0 0 0 0 0 3 1 2 4 0—$R_1$ The highest order digit in $R_1$ is read again and, since it is also zero, the contents of the multiplier register will be shifted anew by one position to the left within the register 0 0 0 0 0 0 0 1 3 8 6 5—$R_2$
0 0 0 0 0 0 3 1 2 4 0 0—$R_1$ This operation is repeated until the first nonzero digit of the multiplier reaches the highest order position within $R_1$, the vacated positions at the lower order side being filled with zeros. At this moment both registers hold the following factors 0 0 0 0 0 0 0 1 3 8 6 5—$R_2$
3 1 2 4 0 0 0 0 0 0 0 0—$R_1$ Now the highest order digit in the multiplier register $R_1$ is read over again and, since this time the digit is not a zero, the contents of both registers are combined or added. During this operation the highest order digit within the multiplicand register $R_2$ is replaced by its complementary digit (i.e., a nine)

9 0 0 0 0 0 0 1 3 8 6 5—$R_2$
3 1 2 4 0 0 0 0 0 0 0 0—$R_1$
1 1 2 2 1 1 2 4 0 0 0 1 3 8 6 5—$R_1$

Consequently, the registers $R_1$ holds the above-mentioned results, i.e., (1)2 1 2 4 0 0 0 1 3 8 6 5

The result is a 13-digit answer. The overflow digit "1" is not considered, so that the multiplier register $R_1$ holds now a 12-digit number 2 1 2 4 0 0 0 1 3 8 6 5—$R_1$ The highest order digit is read over again and since being not a zero, an adding operation is executed anew 9 0 0 0 0 0 0 1 3 8 6 5—$R_2$
2 1 2 4 0 0 0 1 3 8 6 5—$R_1$
1 1 1 2 4 0 0 0 2 7 7 3 0—$R_1$ The highest order digit is read over again and a further adding operation follows 9 0 0 0 0 0 0 1 3 8 6 5—$R_2$
1 1 2 4 0 0 0 2 7 7 3 0—$R_1$
1 0 1 2 4 0 0 0 4 1 5 9 5—$R_1$ The highest order digit within register $R_1$ is read and since it is now a "0," the contents of the multiplier register are shifted a position to left, the vacated position being filled with a "0."

9 0 0 0 0 0 0 1 3 8 6 5—$R_2$
1 2 4 0 0 0 4 1 5 9 5 0—$R_1$

The highest order digit of the multiplier is read and since now not a "0," and adding operation is executed:

9 0 0 0 0 0 0 1 3 8 6 5—$R_2$
1 2 4 0 0 0 4 1 5 9 5 0—$R_1$
1 0 2 4 0 0 0 4 2 9 8 1 5—$R_1$

The processing is pursued until all the digits of the multiplier are processed.

Shifting of the multiplier register contents:

9 0 0 0 0 0 0 1 3 8 6 5—$R_2$
2 4 0 0 0 4 2 9 8 1 5 0—$R_1$

Adding operation:

9 0 0 0 0 0 0 1 3 8 6 5—$R_2$
2 4 0 0 0 4 2 9 8 1 5 0—$R_1$
1 1 4 0 0 0 4 3 1 2 0 1 5—$R_1$

Adding operation:

9 0 0 0 0 0 0 1 3 8 6 5—$R_2$
1 4 0 0 0 4 3 1 2 0 1 5—$R_1$
1 0 4 0 0 0 4 3 2 5 8 8 0—$R_1$

Shifting of the multiplier register contents:

9 0 0 0 0 0 0 1 3 8 6 5—$R_2$
4 0 0 0 4 3 2 5 8 8 0 0—$R_1$

Adding operation:

9 0 0 0 0 0 0 1 3 8 6 5—$R_2$
4 0 0 0 4 3 2 5 8 8 0 0—$R_1$
1 3 0 0 0 4 3 2 7 2 6 6 5—$R_1$

Adding operation:

9 0 0 0 0 0 0 1 3 8 6 5—$R_2$
3 0 0 0 4 3 2 7 2 6 6 5—$R_1$
1 2 0 0 0 4 3 2 8 6 5 3 0—$R_1$

Adding operation:

9 0 0 0 0 0 0 1 3 8 6 5—$R_2$
2 0 0 0 4 3 2 8 6 5 3 0—$R_1$
1 1 0 0 0 4 3 3 0 0 3 9 5—$R_1$

Adding operation:

9 0 0 0 0 0 0 1 3 8 6 5—$R_2$
1 0 0 0 4 3 3 0 0 3 9 5—$R_1$
1 0 0 0 0 4 3 3 1 4 2 6 0—$R_1$

End of the multiplication, the result is:

0 0 0 0 4 3 3 1 4 2 6 0

We claim:

1. A method of multiplying in an electronic calculator or computer having a multiplier register with a number of orders corresponding to the product capacity of the calculator or computer, a multiplicand register having at least one order in excess of the multiplicand capacity of the calculator or computer, and means for registering a multiplier in the lower order side of said multiplier register and a multiplicand in the lower order side of the multiplicand register, said method comprising the steps of:

a. reading the digit in the highest order position of said multiplier register and, upon said digit being "0," stepping the contents of said multiplier register by one order toward the higher order side of the multiplier register and, upon said digit being other than zero, initiating an addition sequence;

b. in each addition sequence, registering a "9" in the highest order position of said multiplicand register, adding the contents of said multiplicand register to the contents of said multiplier register at corresponding orders while summing the digits in the highest order positions of both registers and retaining only the units place of the latter summation, and storing the result of the addition of the contents of said multiplier and multiplicand registers in said multiplier register, whereby any nonzero digit in the highest order position of said multiplier register is reduced by "1" with each addition;

c. repeating steps (a) and (b) until the multiplier stored in said multiplier register is reduced to zero; and d. terminating the multiplication upon reduction of said multiplier to zero while retaining the product of the multiplication in said multiplier register.

2. The method defined in claim 1 wherein, upon conclusion of an addition sequence, any overflow resulting from the presence of said "9" is erased.

3. A multiplication system for an electronic calculator, comprising:

a multiplicand register and a multiplier register having respective orders on one side thereof for storage of a multiplicand and a multiplier, said multiplicand register having a highest order position in excess of the multiplicand capacity and said multiplier having a number of orders at least equal to the product output capacity of the calculator;

means responsive to the contents of said multiplier register for shifting the multiplier in said multiplier register to locate the highest order nonzero digit of said multiplier register in the highest order position thereof;

means for recording a "9" in said highest order position of said multiplicand register;

means for adding the contents of said multiplier register and said multiplicand register and storing the results in said multiplier register whereby the sum of the highest order digit (register) in the highest order position of the multiplier register after such addition is "1" less than the number previously registered therein prior to such addition;

means for repeating the addition of the contents of said multiplier and multiplicand registers and the storage of the results in said multiplier register until the highest order position of said multiplier register contains an "0," said shifting means thereupon displacing the contents of said multiplier register in the direction of its highest order position until a further nonzero digit is located at said highest order position of said multiplier register; and means responsive to said multiplier register for terminating the addition and shifting sequence upon reduction of the multiplier to zero, the product of said multiplier and multiplicand being recorded at said one side of said multiplier register.

4. The system defined in claim 3 wherein said means for shifting the multiplier in said multiplier register comprises a monostable multivibrator having an output, and a first, logic, CRD gate connected between said output and said multiplier register for reading the highest order position thereof, and a second, controlled, CRD gate connected between said monostable multivibrator and said adding means for operating same upon a nonzero digit appearing in said highest order position of said multiplier register.

5. The system defined in claim 4 wherein said means for recording said "9" in said highest order position of said multiplier includes a flip-flop connected to said adding means and a third controlled CRD gate between said adding means and said flip-flop for inverting a "0" code to a "9" code in said highest order position of said multiplicand register.

6. The system defined in claim 5 which includes a second monostable multivibrator, a fourth controlled CRD gate connected between an output of the first-mentioned monostable multivibrator and an input of the second monostable multivibrator and triggered by the calculator control center, a multiplier-digit counter connected to an output of said second monostable multivibrator for recording the processed multiplier digits, a coincidence circuit connected to said counter and operable upon the counting of all of said multiplier digits, a fifth controlled CRD gate having its signal input and signal output connected between an output of said second monostable multivibrator and an input of said first monostable multivibrator and an enabling input controlled by said coincidence circuit, a sixth controlled CRD gate having its signal input and its signal output connected between an output of said second monostable multivibrator and the control center, and an inverter connected between said coincidence circuit and the enabling input of said sixth controlled gate for terminating multiplication.

7. A multiplication system, comprising:

a multiplier register $R_1$ and a multiplicand register $R_2$;

an adding circuit 1 connected to said registers for adding the contents thereof;

a first monostable multivibrator 5 triggerable to control the multiplication system and having at least one output;

a first controlled CRD gate 7 between an output of said first monostable multivibrator 5 and said adding circuit 1 for initiating, together with said monostable multivibrator, and adding operation;

an adding-cycle counter 2 responsive to the addition in said adding circuit 1 of the contents of said registers $R_1$, $R_2$, order by order and connected to said adding circuit;

a first coincidence circuit 16 connected to said adding-cycle counter 2 and responsive to the completion of the addition of all of the orders of said registers;

a second controlled CRD gate 14 having an enabling input connected to said coincidence circuit 16 and a signal input connected to said adding circuit 11, a third controlled CRD gate 15 having its signal input and signal output connected between said adding circuit 1 and said first monostable multivibrator 5 and a first inverter 3 connected between said first coincidence circuit 16 and the enabling input of said third controlled gate 15 for repeated cycling of said adding circuit 1 until said adding-cycle counter 2 and coincidence circuit 16 respond to the conclusion of an adding sequence;

a fourth controlled CRD gate 13 having its signal input connected to said adding circuit 1, and a flip-flop 4 having its input connected to the signal output of said fourth controlled gate 13 and connected to circuitry for registering a "9" in the highest order position of said multiplicand register $R_2$, said fourth controlled gate 13 having its enabling input connected with said first inverter 3;

a fifth controlled CRD 8 connected to an output of said first monostable multivibrator 5, and a second monostable multivibrator 6 connected to said fifth controlled CRD gate 8;

a multiplier-digit counter 17 connected to an output of said second monostable multivibrator 6, a second coincidence circuit 21 connected with said multiplier-digit counter 17 and responsive to the total number of multiplier digits processed for producing an output, and a sixth controlled CRD gate 9 having its signal input connected with an output of said second monostable multivibrator 6 and its signal output connected with an input of said first monostable multivibrator 5 while the enabling input of said sixth gate 9 is connected to said second coincidence circuit for continuing processing of the multiplier to the counting of all the digits thereof; and a seventh controlled CRD gate 10 having its signal input connected to the output of said second monostable multivibrator 6 and a signal output 22 terminating the multiplication process, and a second inverter 20 connected between said second coincidence circuit and the enabling input of said seventh controlled gate 10.

8. The system defined in claim 7, further comprising a first logic CRD gate 12 connected between the output of said first monostable multivibrator 5 and said multiplier register $R_1$ for effecting reading the highest order digit of said multiplier register.

9. The system defined in claim 8, further comprising a second logic CRD gate 11 for clearing the registers of overflow upon the termination of the adding sequence.

10. The system defined in claim 7 wherein the recordal of the "9" in the highest order position of the multiplicand register is effected simultaneously with the addition of the contents of both registers.

* * * * *